H. F. Bond,
Bread Cutter,
Nº 27,199. Patented Feb. 21, 1860.
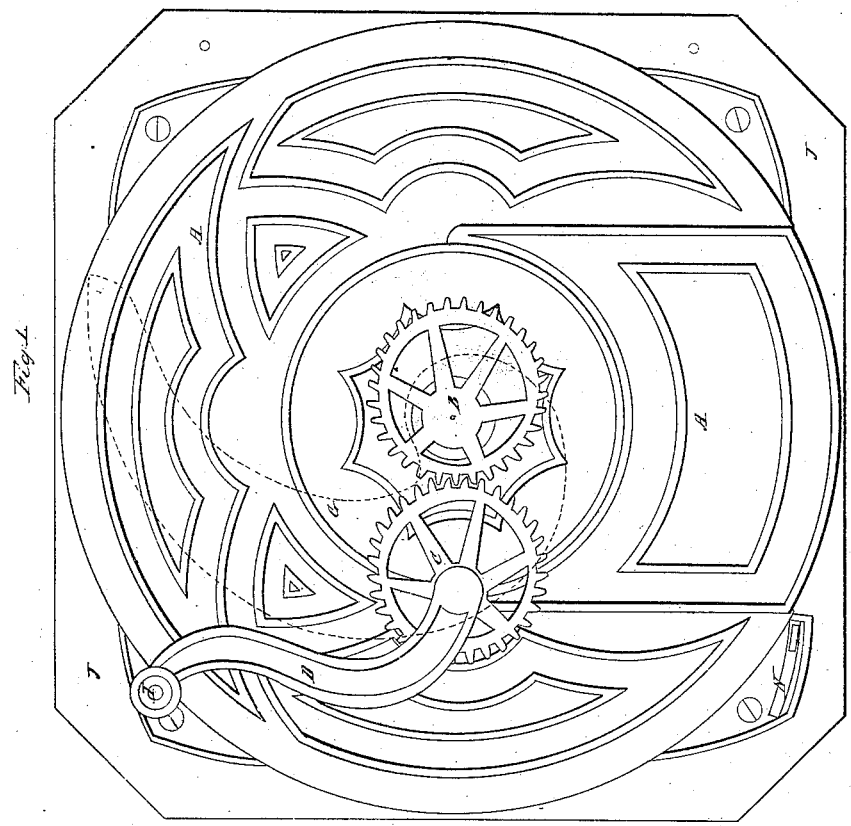
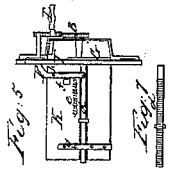
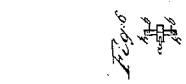
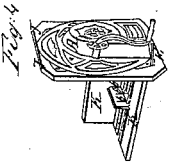
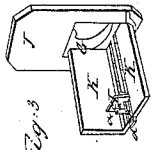
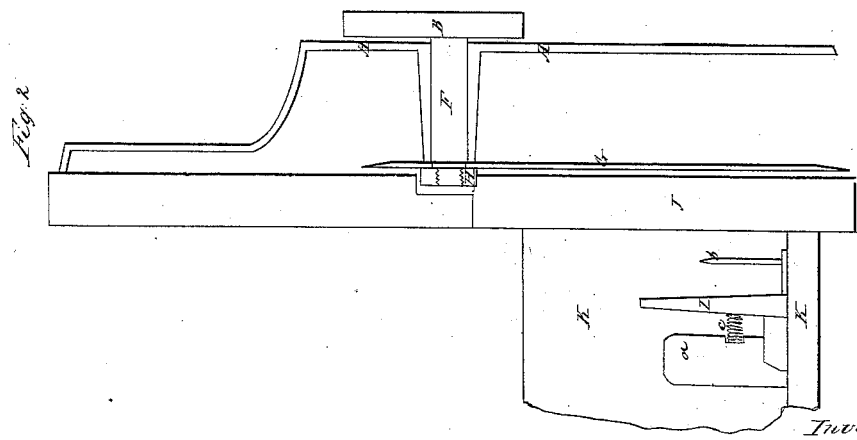
Witnesses.
Inventor,
Henry F. Bond

UNITED STATES PATENT OFFICE.

HENRY F. BOND, OF WALTHAM, MASSACHUSETTS.

BREAD-SLICER.

Specification of Letters Patent No. 27,199, dated February 21, 1860.

*To all whom it may concern:*

Be it known that I, HENRY FREDERIC BOND, of Waltham, in the county of Middlesex and State of Massachusetts, have invented an Improved Bread-Slicer, of which the following is a full, clear, and exact description, reference being had to the accompanying drawings, making part of this specification, in which—

Figure I is front elevation of the machine. Fig. II is a view of a section made vertically through the center. Figs. III and IV are perspective views of the whole machine. Fig. V view of the under side. Fig. VI the carriage (under side). Fig. VII upper side of rack or feeder.

My present invention has for its object the production of a "bread slicer," by means of which a loaf of bread may be cut into pieces of various and uniform thickness as required, and consists in the employment of a carriage on which the loaf is secured, and which is fed forward the requisite distance at each turn of the crank, a rotary knife and eccentric gearing.

That others skilled in the art may understand and use my invention, I will proceed to describe the manner in which I have carried out the same.

In the said drawings A is a casting of iron which supports the gearing and together with J which is made of wood forms a box to contain the knife G.

B and C are eccentric gears being in the form of an ellipse, and pivoted at one of the foci of the ellipse. These are precisely of a size and similar and so geared into each other that the radius of one shall always meet the complementary radius of the other. The object of this eccentric gearing is to give a gradual increase of power, to correspond as near as may be with the increasing resistance of the knife G as it cuts farther and farther from the shank F upon which it is bearing. This gearing may also be used when an increase or decrease of speed is desirable. The form of the knife G may be seen by the dotted lines in Fig I. Nearly the whole convex edge is sharpened.

D is a crank which at every revolution strikes the lever E at the end nearest the handle, and moves E which is pivoted at $h$ in such a manner as to cause its opposite end in which a slot is cut to move forward toward the knife. The slot plays over a pin which is fastened into or cast upon the rack $d$, by which means the rack is thrown forward. The rack is thrown back by the spring $e$. The distance of throwing back the rack is regulated by a button $f$ which turns upon a pivot set one side of the center, so that the movement of the lever F will be greater or less according to which side of the button $f$ is turned toward it.

The carriage I is moved by the rack $d$, there being a pawl $a$ which catches in the rack, and there being friction springs under the carriage inserted in the holes $k$ $k$ (see Fig. VI) and these springs preventing the carriage both from being jerked too far forward and from slipping back with the rack.

K represents the board which holds the bread.

The carriage I has grooves in it which fit the strips of iron $i$, $i$, screwed upon the wood and keep it in place.

$c$ is a spring to the pawl $a$.

$g$ is an iron band to strengthen the box and hold the rack $d$ in place.

The knife G is so adjusted that it is raised whenever the lever E is struck by the crank, and the bread may pass under it. Thus a loaf pressed down upon the points $b$ $b$ $b$ is cut completely into slices by simply turning the crank D.

H is a nut which holds the knife to the shaft.

N a slot through which E plays.

The machine may be screwed firmly to the wall after the manner of a common coffee mill or otherwise.

What I claim as my invention and desire to secure by Letters Patent is—

The combination and arrangement of the eccentric gear wheels B and C, the knife G, the lever E, the carriage I and the rack $d$ all substantially as and for the purpose specified.

HENRY F. BOND.

In presence of—
GUSTAVUS N. SORNABY,
GEO. WM. BOND.